May 20, 1958  E. T. ARMSTRONG  2,835,355
BRAKE DISC
Filed Jan. 4, 1956

INVENTOR.
EDWARD T. ARMSTRONG
BY
ATTORNEY

United States Patent Office 2,835,355
Patented May 20, 1958

2,835,355
BRAKE DISC

Edward T. Armstrong, Butler, N. J., assignor to The Goodyear Tire & Rubber Company, Akron, Ohio, a corporation of Ohio Application January 4, 1956, Serial No. 557,291

4 Claims. (Cl. 188—218)

This invention relates to disc-type brakes in which one or more annular discs carried by a rotatable member such as a wheel, are adapted to be frictionally engaged by stationary brake shoes pressed into contact with their radial faces. The invention is particularly useful in disc brakes for the landing wheels of aircraft where great amounts of energy must be absorbed over a short period of time. The disc of this invention is not however confined to such use and may also be useful in brakes for road vehicles or for use in other machines.

Heretofore, it has been found that the disc type of brake is a very satisfactory one for use on aircraft. As the landing speeds of aircraft have increased, greater and greater amounts of energy must be absorbed over a short period of time during landing of the aircraft. The absorption of such great amounts of energy has caused difficulty in that the brake discs are heated unequally or non-linearly over their braking faces causing the discs to expand unequally causing them to dish, shrink, and to develop wave forms in the disc surface.

The present invention aims to overcome the foregoing and other difficulties.

Objects of the invention are to inhibit shrinkage, dishing, and formation of wave forms in the disk surface and to provide a disc that will remain relatively stable as to form under rapid local application of energy thereto.

Another object is to reduce the magnitude of forces acting upon the keys which retain the disc against relative rotation to its support and to induce gradual transcendental variation in these forces in preference to instantaneous variations tending to produce key failures by battering or shock.

Other objects are to provide a monolithic disc in which excessive stresses due to rapid absorption of energy are reduced or eliminated by substantially radial slots extending either to the inner and/or to the outer peripheries of the disc, and to so locate the slots relative to the key notches as to provide a nonredundant sectoral element of the disc in which the relation among frictional force, key force components, and slot reactions, is optimized over the range in angular travel of the friction element.

Other objects are to provide a simple disc construction adapted to ordinary machining methods and to simplify manufacture.

These and other objects will appear from the following description and the accompanying drawings.

Figure 1:
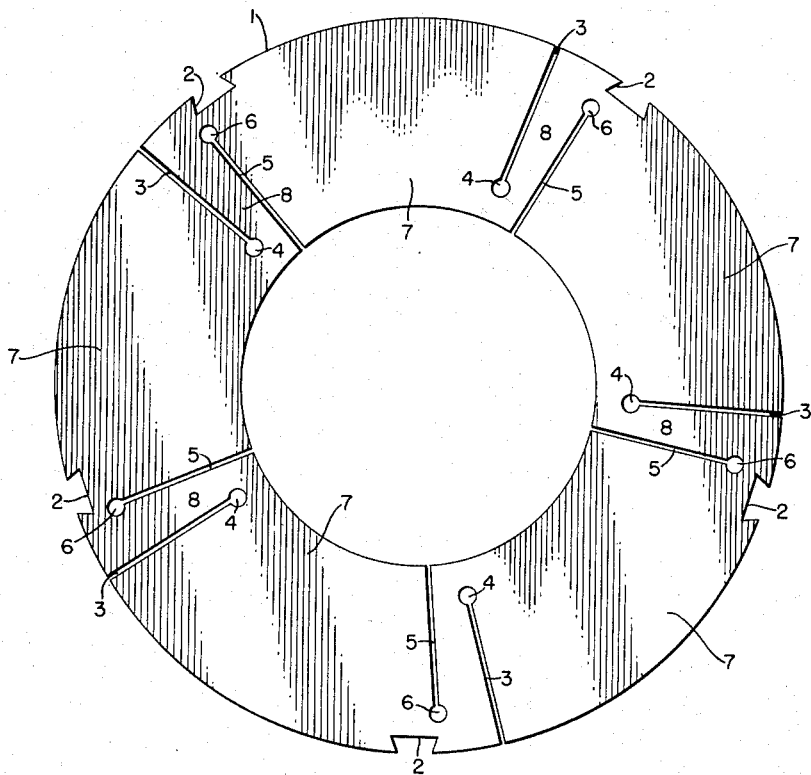
Fig. 1 is a plan view of a brake disc constructed in accordance with and embodying the invention.
Figure 2:
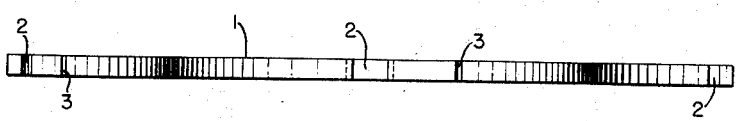
Fig. 2 is an edge view thereof.

Referring to the drawings, the numeral 1 designates a brake disc of monolithic construction such as iron, steel or other heat conductive metal. For supporting the disc from a wheel or other rotating body, a number of equally spaced keyways or notches 2 are formed in the outer periphery of the disc for fitting over driving keys carried by the wheel. The notches 2 are preferably of trapezoidal or dovetail shape and are preferably odd in number to reduce any tendency to excite harmonic vibrations in use. In the brake, the disc is free to float axially along the axis of rotation upon the keys entering the notches 2.

To provide against shrinkage, dishing, undulating or other distortion of the disc by local absorption of energy or nonlinear heating thereof, the disc 1 is formed with radial slots 3 extending to the outer periphery of the disc from round openings 4 drilled through the disc, and radial slots 5 extending to the inner periphery of the disc from round openings 6 drilled through the disc. While any number and arrangement of the outer terminating and inner terminating slots may be provided, it is preferred to provide one inner peripheral terminating slot 5 arcuately slightly in advance of each key slot 2 and one outer peripheral terminating slot 3 slightly in advance arcuately of each slot 5, with the inner and outer terminating slots near one key slot and the similar pair of slots adjacent the next key slot defining a sector 7 of the plate having a certain freedom of movement relative to the remainder of the plate by reason of the sectors adjacent one another being joined by a more or less resilient connecting neck 8 extending radially of the plate 1 between slots 3 and 5. At the same time, each sector 7 is anchored by a key notch at one end thereof engaging its key which takes the thrust due to braking.

The slots 3 and 5 permit essentially stress-free changes of circumference of the disc sectors due to the ability of the slots to close in under expansion of the disc and to the marked tangential flexibility of the neck 8, as well as to the fact that expansion of the connecting necks 8 under heating is in a radial direction opposite to the principal expansion of the adjacent portions of the sectors 7.

The brake disc of this invention may be made from a flat sheet or plate of appropriate material by machining a flat parallel-sided disc therefrom, milling the key notches therein and drilling and sawing the radial slots 3 and 5. The slots may be about .030 inch wide and are preferably normal to a face of the disc or parallel to the axis of the disc. However, for increased cooling of the disc, the slots may be inclined relative to a face of the disc or helically of the axis of rotation of the disc so that a forced circulation of cooling air may be induced therethrough.

By constructing the disc with the key slots 2 at the extreme trailing end of the sectors 7 in the direction of rotation of the disc, a generally compressive stress system is achieved which reduces plastic deformations. In addition, it is possible to reduce the magnitude and the variation of radial key forces with this configuration.

The disc of the invention may be used as one member of a brake when the opposing brake member is either a continuous braking surface or comprises a plurality of discrete braking surfaces preferably corresponding in number to the sectors of the disc and symmetrically arranged thereabout.

In the case where a symmetrical lining arrangement is used either as a continuous surface or as a plurality of surfaces discretely located about the disc surfaces, the radial key reactions may reduce to zero. This is so for a continuous opposing lining surface or for a discrete number symmetrically located and equal in number to the number of sectoral elements of the disc.

The neck 8 is designed to develop radial reactions with minimized deflection in a radial direction. These reactions may reach appreciable levels in view of the marked radial rigidity of the neck. Conversely, the neck is flexible in a tangential direction and cannot develop appreciable tangential reactions. In consequences, thermal changes tending to increase disc dimensions can induce these dimensional variations without restraint. Since no stresses arise, plastic deformations, dishing, etc. do not occur. However, since radial rigidity is retained, the general configuration of the disc is retained. The result is a disc which can behave like a rigid structure in one sense while it exhibits controlled great flexibility as desired.

While a certain representative embodiment and details have been shown for the purpose of illustrating the invention, it will be apparent to those skilled in this art that various changes and modifications may be made without departing from the spirit or scope of the invention.

I claim:

1. A brake disc including a plurality of circumferentially-aligned arcuate segments each of substantial arcuate extent, a radially-directed connecting neck portion positioned between and integrally joining each pair of adjacent segments and extending substantially between the outer periphery of one segment and substantially the inner periphery of the adjacent segment so as to provide relatively free movement between the segments in a tangential direction and relatively limited movement in a radial direction, said segments and necks being of substantially the same axial thickness and all formed from the same piece of metal and having radially-inward and radially-outward directed slots in the disc defining the sides of each neck, each segment having a key notch in its outer peripheral margin near the trailing end thereof in the direction of rotation of the disc in use.

2. A brake disc including a plurality of circumferentially-aligned arcuate segments each of substantial arcuate extent, a radially-directed connecting neck portion positioned between and integrally joining each pair of adjacent segments and extending substantially between the outer periphery of one segment and substantially the inner periphery of the adjacent segment so as to provide relatively free movement between the segments in a tangential direction and relatively limited movement in a radial direction, said connecting neck portion being separated from said arcuate segments by radial slots extending through the disc from the inner and outer peripheries of the disc to near the opposite periphery, said segments and necks being of substantially the same axial thickness and all formed from the same piece of metal by having radially-inward and radially-outward directed slots in the disc defining the sides of each neck.

3. A brake disc including a plurality of circumferentially-aligned arcuate segments of a single piece of sheet material, a radially-directed neck of said material between and joining each pair of adjacent segments and extending substantially between the outer periphery of one segment and substantially the inner periphery of the adjacent segment so as to provide relatively free movement between the segments in a tangential direction and relatively limited movement in a radial direction.

4. An annular brake disc having a plurality of driving notches equally spaced about its perimeter for driving it from a rotating wheel, said disc being provided near each driving notch with an arcuately small strain-relieving sector radially bounded by a radial slot extending outwardly from the inner periphery to a position near the outer periphery and a radial slot extending inwardly from the outer periphery to a position near the inner periphery of the disc, said small strain-relieving sectors connecting sectors of greater arcuate extent each extending from one driving notch to a position separated from an adjacent driving notch only by one of said small strain-relieving sectors, and one strain-relieving sector and its adjacent sector of greater arcuate extent together spanning the arcuate distance from one driving notch to an adjacent one.

References Cited in the file of this patent

FOREIGN PATENTS 1,020,302   France _____ Feb. 4, 1953

OTHER REFERENCES

Ser. No. 322,595, Maier et al. (A. P. C.), published May 18, 1943.